United States Patent [19]

Devienne

[11] 4,321,910

[45] Mar. 30, 1982

[54] EMITTER-RECEIVER PANEL HAVING HIGH RADIANT ENERGY EFFICIENCY

[76] Inventor: Fernand M. Devienne, 117, Boulevard de la Croisette, 06400 Cannes, France

[21] Appl. No.: 144,914

[22] Filed: Apr. 29, 1980

[30] Foreign Application Priority Data

May 4, 1979 [FR] France .............................. 79 11310

[51] Int. Cl.³ ............................................. F24J 3/02
[52] U.S. Cl. .................................. 126/439; 126/449; 350/299
[58] Field of Search .............. 126/438, 439, 441, 449, 126/450, 451; 350/299, 300, 288, 298

[56] References Cited

U.S. PATENT DOCUMENTS

| | | | |
|---|---|---|---|
| 3,208,447 | 9/1965 | Laszlo | 126/441 |
| 4,079,724 | 3/1978 | Zwillinger | 126/441 |
| 4,084,575 | 4/1978 | Nicewonger | 126/432 |
| 4,088,115 | 5/1978 | Powell | 126/442 |
| 4,106,479 | 8/1978 | Rogers | 126/439 |

Primary Examiner—James C. Yeung
Attorney, Agent, or Firm—Lane, Aitken, Kice & Kananen

[57] ABSTRACT

The panel is constituted by a heat-conducting flat metallic support plate provided with at least one absorbent surface composed of metallic tubes in the form of right circular cylinders having axes at right angles to the surface and disposed on a uniform lattice, and by right circular metallic cones each placed within the interior of one of the metallic tubes. The base of each cone is located at the intersection of each tube with the flat plate and the apex of each cone is located at a point within the interior of the tube. The external surface of each cone cooperates with the internal surface of the tube within which the cone is located in order to trap the entire radiation received by the panel.

12 Claims, 14 Drawing Figures

EMITTER-RECEIVER PANEL HAVING HIGH RADIANT ENERGY EFFICIENCY

This invention relates to techniques for collection and transfer of thermal energy by radiation and is accordingly directed to receiver-emitter panels having high radiant energy efficiency. It is known that thermal energy is developed and transmitted at a distance throughout the universe in the form of electromagnetic waves. When electromagnetic radiation emitted by a body A encounters another body B, the matter of the body B absorbs at least part of this radiation and converts it into heat, thus increasing the temperature of the body B. Conversely, if the body B is heated to a predetermined non-zero temperature, it radiates or in other words loses at least part of its heat in the form of electromagnetic radiation which is emitted by said body.

This reversible conversion of heat to radiation in contact with an absorbent material body permits heat transfer at a distance since electromagnetic radiation is transmitted in space at the velocity of light. The possibility of subsequent exchange by conduction or convection of the heat thus gained by a material body in a heat-exchanger system in which a heat-transporting fluid is circulated makes it possible at least theoretically to collect and utilize the radiant energy for purposes of industrial recovery. It is also known that the energy emitted per unit area by a body heated to the absolute temperature T is given by the formula:

$$W = \sigma E T^4$$

in which $\sigma$ is the Stefan constant,

E is the emissivity, defined as the ratio of the emissive power of the body considered to the emissive power of the black body. This emissivity E varies from 1 (in the case of a black-body radiator) to 0 (in the case of a perfect reflector). In general, bodies which are good emitters (E in the vicinity of 1) also have a good capacity for absorption of radiant energy, the ideal limit in this field being represented by a black body.

Should it consequently be desired to carry out energy exchange by radiation, provision must accordingly be made for emitter-absorber bodies having properties which are as close as possible to those of a black body (E being also as close to 1 as possible), said bodies being presented in a form which is compatible with fabrication and ease of use in industry. To this end, experimental black-bodies consisting in the majority of instances of hollow cavities provided with an orifice or a narrow slit cannot be employed in practice.

Essentially with a view to collecting solar radiation, it has been endeavored in the prior art to construct metallic panels provided at the surface with reflecting means which are capable of trapping the radiation. It is known in particular that, when radiation impinges upon any surface, only part of the incident energy is absorbed whilst the remainder is reflected. In the field of solar collectors, it has been endeavored to form surfaces having absorbent properties which are as close as possible to those of a black body or in other words such that the incident energy is entirely absorbed. In accordance with conventional practice, the absorbers of known solar collectors are provided with a coating of black paint or alternatively with a coating of selective paint which preferably absorbs radiations having a predetermined wavelength. The absorption efficiency of collectors of this type is thus distinctly improved. However, such methods cannot prevent reflection of a fraction of the incident energy which impinges upon the solar collector. Furthermore, the coat of paint applied to these solar collectors constitute a thermal resistance to heat conduction, thereby reducing the efficiency of the absorber.

The panels described in U.S. Pat. No. 4,079,724 and No. 4,088,115 have only a medium absorption capacity, however, and are strictly limited in their application to collection of solar energy to be converted into heat which is immediately removed by a heat-transporting fluid. Moreover, the devices described in U.S. Pat. No. 4,079,724 (to Zwillinger) are of highly complex structural design since the absorbant surface employed has both concave and convex portions terminating in a zone having the shape of glove-fingers arranged in a spiral configuration in much the same manner as the shell of a snail. In theory, a structure of this type is intended to concentrate the radiation energy by "enclosing" it within the spirally-shaped glove-fingers and to increase the panel temperature by preventing radiation from this latter (see FIG. 6). However, it should be observed in the first place that such a reasoning is fallacious since, as already recalled in the foregoing, bodies which are good radiation absorbers are also good emitters. In the second place, even assuming that the expected result is in fact achieved, this would not permit the use of a panel of this type as a receiver-emitter for remote transmission of radiant energy and for example for cooling a high-temperature source since said panel is active only on one face.

The precise aim of the present invention is to provide an emitter-receiver panel having high radiant energy efficiency in which a simple and readily formed geometrical structure makes it possible to absorb and to re-emit the available energy in the form of radiation either for the direct exchange of said radiation with a heat-transporting fluid or for remote transmission to other identical panels, then finally to a heat-transporting fluid.

Said high-efficiency emitter-receiver panel is essentially constituted by a heat-conducting flat metallic support plate on at least one face of which is provided an absorbent surface composed of metallic tubes in the form of right circular cylinders having axes at right angles to the surface and disposed on a uniform lattice, and by right circular metallic cones each placed within the interior of one of said tubes in the form of right circular cylinders. The base of each cone is located at the intersection of said cylindrical tube with said flat plate and the apex of each cone is located at a point within the interior of said cylindrical tube. The external surface of each cone is adapted to cooperate with the internal surface of the cylindrical tube within which said cone is located in order to trap the entire radiation received by said panel.

According to an important feature of the present invention, the difference between the height of the right cylindrical metallic tubes and the height of each of the metallic cones located within said right cylindrical metallic tubes is such that an incident ray impinging upon the surface of a cone is reflected from the internal wall of the tube into which said ray has passed.

By virtue of this particular arrangement, any incident electromagnetic radiation which falls on the surface is subjected thereon to a large number of successive reflections during which the constituent photons progressively release part of their energy.

In accordance with the different possible modes of utilization of the emitter-receiver panel which forms the subject of the invention, the cylindrical metallic tubes may or may not be in contiguous relation over the entire surface of the metallic support plate. Moreover, said support plate can be flat and of constant thickness or may on the contrary have a variable thickness so that at least one of its absorbent faces may have a slightly convex or concave profile. In the last-mentioned case, an effect of optical concentration similar to that obtained with a mirror is added to the absorbent or emitting effect proper. This can prove very useful in the case in which the heat initially collected is transmitted successively by means of a certain number of panels placed in series to the heat-transporting fluid which is finally employed for heat removal.

In accordance with another mode of execution of the invention, the two absorbent faces of one and the same panel can be equipped with right cylindrical metallic tubes disposed on each side of the plate on uniform lattices with different pitches. In accordance with an advantageous alternative embodiment, the diameter of the cylinders provided on each of the two faces of the plate can also be different.

In certain modes of execution of the invention in which it is necessary in particular to extract heat through the wall of a closed chamber, the emitter-receiver panel is constructed from a metallic support plate which is non-continuous. In this alternative embodiment, two modes of execution are possible.

In the first mode of execution, the absorbent double-surface panel is constituted by cylindrical tubes each fitted in the central portion thereof with two cones having common bases joined together in contiguous relation, said tubes being adapted to traverse a wall from one side to the other through openings in which they are inserted and disposed on a uniform lattice.

In the second mode of execution, the absorbent double-surface panel is constituted by cylindrical tubes each fitted in the central portion thereof with a solid metallic element having the shape of a right cylinder and extended at the two extremities thereof by two cones having oppositely directed apices, said cylindrical tubes being adapted to traverse a wall through openings in which they are inserted and disposed on a uniform lattice.

The materials constituting the emitter-receiver in accordance with the invention, and especially the flat metallic plate, the right cylindrical metallic tubes and the right metallic cones are fabricated from heat-conducting material such as, for example, copper, aluminum, brass and their different alloys. Steel, stainless steel and tantalum are also employed at high temperatures.

Potential applications of the radiant-energy emitter-receiver panel extend over a very wide range. A few such applications will be mentioned by way of indication in the following description.

The emitter-receiver panel according to the invention can be provided essentially in two different forms, namely a first form which will be designated hereinafter as $P_1$ and in which only one of the faces of the metallic support plate is provided with an absorbent surface and a second form designated hereinafter as $P_2$ in which the metallic support plate is provided with an absorbent surface on both faces. It must in any case be clearly understood that, when the present description makes mention of an absorbent surface, this is implicitly understood to mean that the surface is also capable of emission in accordance with the general principles recalled at the outset and that, in consequence, the terms "emitting" and "absorbent" must be considered as practically interchangeable in the present description.

Whether the emitter-receiver panel in accordance with the invention is of the type designated as $P_1$ or of the type designated as $P_2$, the panel can be employed essentially in two different ways.

In a first mode of utilization, the emitter-receiver panel is employed alone. Electromagnetic radiation is received on one face of the panel and converted into heat by this latter, the heat being restituted by the other face directly to a heat-transporting fluid which flows in direct contact with said face.

In a second mode of utilization, the emitter-receiver panel which is necessarily of the $P_2$ type in this case is employed only as an intermediate link in a chain of a plurality of panels which serve to transmit heat from a point A to a point B. A panel of this type receives radiation on one of its faces, absorbs the radiation and converts it into heat, then re-emits a large proportion of this radiation through its other face towards the next panel. This process can be repeated a certain number of times until the second face of the last panel in the series is in contact with a heat-transporting fluid which is capable of removing the heat thus transmitted for purposes of industrial utilization.

A certain number of potential applications of the panel in accordance with the invention can be mentioned by way of example. Their diverse character will serve to show the general extent of use of this device.

One highly advantageous application lies, for example, in the use of a panel as a solar energy collector. A single panel is usually employed for this purpose, the second face of the panel being in contact with a heat-transporting fluid for the recovery of heat.

Another equally advantageous application consists in cooling a heating appliance placed either in free air or in a vacuum.

In a domestic installation, it is possible by means of the emitter-receiver panel in accordance with the invention to collect a high proportion of the heat of a chimney or fireplace and utilize it for heating a heat-transporting fluid: the heat which is thus collected and which would otherwise have been lost can thus be rediffused into a room even of large size in comparison with the dimensions of the fireplace.

A possibility which can also be contemplated consists in employing the panel in accordance with the invention for extracting the heat produced by a furnace or a heat engine and transferring it over a considerable distance (several meters) to a heat-transporting fluid and in particular to a gas under pressure connected in a closed circuit to a turbine which drives an electric generator.

Finally, the elementary geometrical shapes employed are of such simplicity that the panel in accordance with the invention has a very important advantage over the various solutions proposed in the prior art in that it offers the possibility of mechanical construction by means of well-tried industrial processes such as die-stamping.

The distinctive features and advantages of the invention will in any case become more apparent on consideration of the following description relating to a number of exemplified embodiments of the emitter-receiver panel, the description being given solely by way of explanation and not in any limiting sense and reference being made to the accompanying drawings, in which.

Figure 13:
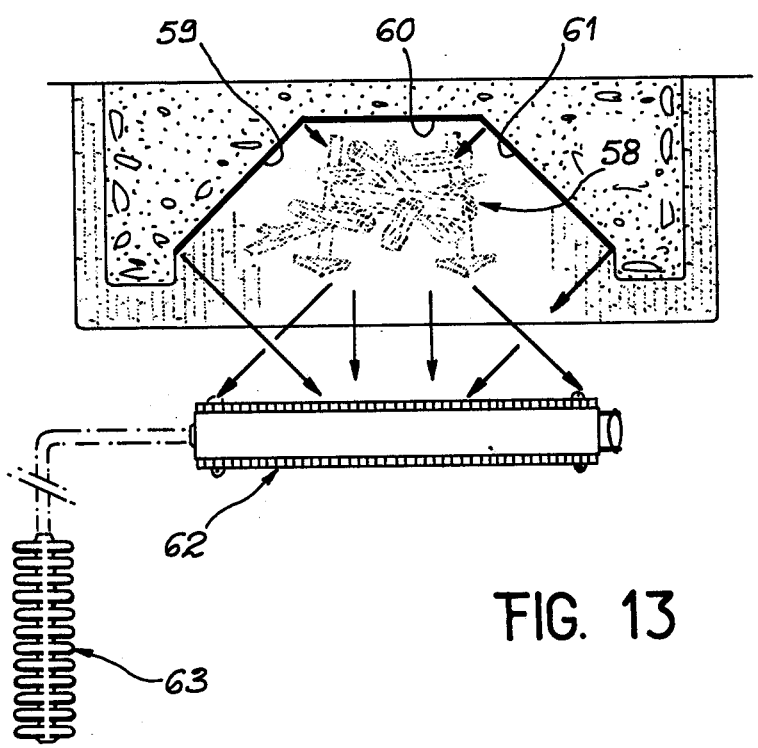

FIG. 13 also shows a combination of several P₁-type panels whereby the heat radiated by a hearth or fireplace can be recovered by a heat-transporting fluid.

Figure 1:
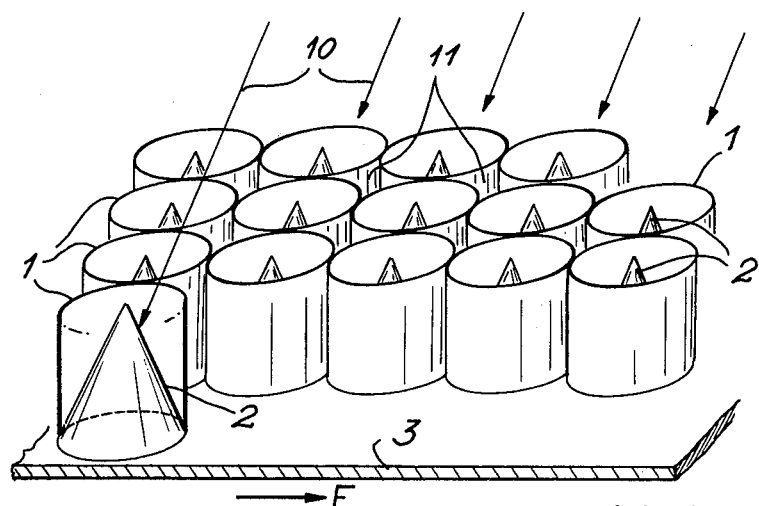
FIG. 1 shows a view in perspective of an emitter-receiver panel in accordance with the invention and of the P₁ type, that is to say which is covered only one surface with an absorbent structure of cylindrical tubes and cones.

The perspective view of FIG. 1 illustrates the structure of cylindrical metallic tubes such as the tube 1 and of metallic cones such as the cone 2 formed on the metallic support plate 3 of an emitter-receiver panel of the type P₁ in accordance with the present invention. In the case of the embodiment illustrated in FIG. 1, the cylindrical metallic tubes 1 are right circular cylinders. Within each right circular cylinder 1, there is placed a cone such as the cone 2, the base of which is located at the intersection of the cylinder 1 with the flat plate 3. The cylinders 1 within which are placed cones such as those designated by the reference numeral 2 are disposed on a uniform lattice on the metallic plate 3 and are contiguous in this example.

The external surface of each cone 2 is adapted to cooperate with the internal surface of the cylinder 1 within which said cone is located. In fact, the absorbent structure of cones and cylinders shown in FIG. 1 receives electromagnetic radiation such as solar radiation 10, for example. Each ray 10 encounters the external surface of a cone 2 or alternatively the internal surface of a cylindrical tube 1. The ray then undergoes a large number of reflections within these structures and practically its entire energy can thus be absorbed. It may also happen that a ray such as 10 reaches said structure within a zone defined by the external surfaces of four adjacent cylindrical tubes such as the tube 1. In this case, the ray is not trapped as a result of cooperation of the surfaces of the cone and of the cylinder. Nevertheless, the ray still undergoes a certain number of reflections and releases part of its energy during these reflections. Furthermore, the space 11 between a number of cylindrical tubes such as the tube 1 is of small size and in any case less than one-quarter of the total surface area.

Figure 2:
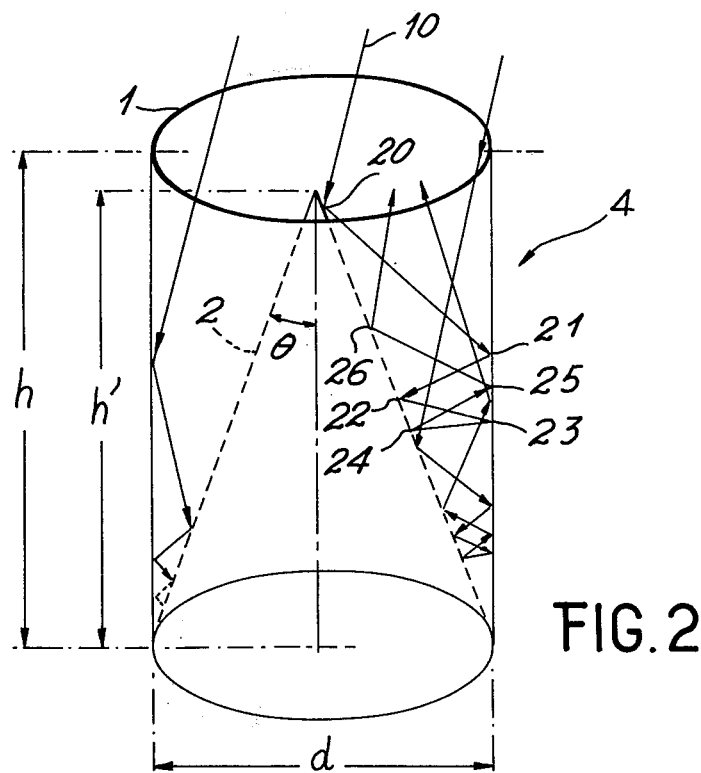
FIG. 2 shows an enlarged view of an element constituting the absorbent structure of the panel of FIG. 1.

FIG. 2 is an enlarged view of one of the elements 4 which forms part of the structure of tubes 1 and cones 2 shown in FIG. 1, said element being constituted by a tube in the form of a right circular cylinder and by a right circular cone. FIG. 2 serves to show how a ray 10 is trapped as it encounters the internal surface of an element 4. Said ray 10 strikes the surface of the cone 2 and undergoes a first reflection at 20, then strikes the internal surface of the cylindrical tube 1 at 21, whereupon the ray undergoes a second reflection. The ray 10 is then reflected successively from the surfaces of cone 2 and cylindrical tube 1 respectively at 22, 23, 24, 25, 26, and finally passes out of the element 4. Thus the ray 10 considered has been reflected seven times from the internal surface of said element 4. During each of its reflections, a fraction of the energy initially possessed by the ray has been yielded to the element 4. Said element is formed of metallic material which is preferably endowed with good heat conductivity such as, for example, copper, aluminum or even brass. However, panels intended for high temperature service are fabricated from metals or alloys which usually have lower thermal conductivity but are more or less refractory, such as steel, stainless steel and tantalum.

After multiple reflection, the ray 10 has thus yielded practically all of its energy to said element 4. In fact, the coefficient of absorption of the metallic surfaces of the cylinder 1 and of the cone 2 is of relatively low value since said surfaces are not provided with any coating of black or selective paint with a view to increasing this value. If the letter a designates said coefficient of absorption, the fraction of the total energy not transferred to an element 4 by a ray 10 which impinges upon the internal surface of the element 4 is given by the formula $E=(1-a)^n$ in which n is the number of reflections experienced by the ray 10 considered within the interior of said element 4. It is readily apparent that the number n of reflections in the case of a given ray is variable and dependent on the angle of incidence of said ray. This number is of minimum value when the light rays are strictly perpendicular to the surface of the flat metallic plate 3 on which the elements 4 are fixed. In this case, the number of reflections is at least equal to five. In the majority of instances, the number n of reflections is greater than ten and can even be distinctly higher than twenty in many cases. If a number n of reflections equal to ten on an average is adopted as a basis for calculation and if a value of 0.2 is adopted for the coefficient of absorption a (which is a relatively unfavorable assumption), an absorption of the order of 0.9 is obtained as a result. It can be assumed in actual fact that the absorption is higher than 0.9 inasmuch as the coefficient a has a value which exceeds 0.2 at the end of a predetermined period of time by reason of exposure to the atmosphere since the absorbent surface of the elements 4 does not remain in a polished condition even if such a condition existed at the outset.

The semivertical angle or half angle $\theta$ of the cone is not a matter of free choice. In fact, the mean number of reflections depends on the value of this angle. The mean number of reflections accordingly increases when the angle $\theta$ decreases. Furthermore, the height h' of the cone 2 is chosen so as to ensure that the cone cannot receive rays perpendicular to its generator-lines in order to prevent the occurrence of one simple reflection. If h designates the height of the cylinder 1 and d designates its diameter, it is only necessary to ensure that h−h' is greater in value than d/2 tangent $\theta$ in order to satisfy the above-mentioned condition. By way of example, the value adopted for $\theta$ is 20 degrees, with the result that h'=1.375 d. Under these conditions, the coefficient of absorption of the structure shown in FIG. 1 is of high value irrespective of the angle of incidence of the electromagnetic radiation 10. As soon as this angle of incidence exceeds 10 degrees with respect to the normal to the flat metallic plate 3, the energy of the light rays is almost completely absorbed.

By way of example, there has been formed a structure of cones and cylinders in which the cylinders have a diameter of 5 mm and a height of 10 mm, the height of the cones being 6.9 mm.

The emitter-receiver panel of the type $P_1$ shown in FIG. 1 has only one absorbent surface (tubes 1 and cones 2) located above the metallic support plate 3. The underside of said plate 3 remains smooth and can be placed in contact with a heat-transporting fluid which flows in the direction of the arrow F in order to remove the heat trapped by the absorbent surface and transmitted by the plate 3.

Figure 3:
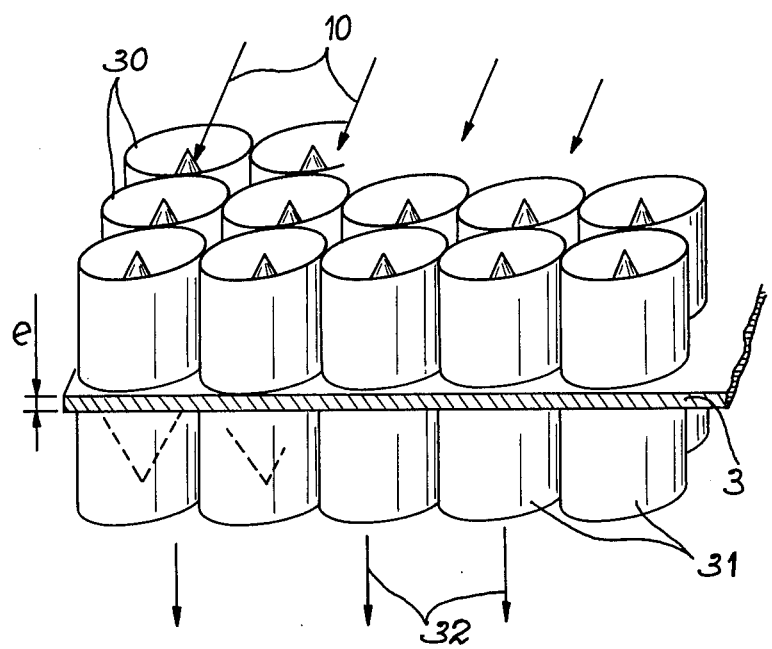
FIG. 3 shows an emitter-receiver panel in accordance with the invention and of the P₂ type, that is to say having an absorbent surface on each of its two faces.

In FIG. 3, there is shown an emitter-receiver panel in accordance with the invention and of the $P_2$ type, that is to say in which an absorbent structure 30 is provided on the top face of the metallic base plate 3 and in which an emitting structure 31 is provided on the bottom face of said plate. The two structures are in strictly symmetrical relation and composed (as in the example shown in FIG. 1) of cylindrical metallic tubes 1 and cones 2 placed within said metallic tubes. Assuming that the absorbent surface 30 receives radiation energy 10, said surface absorbs and then converts said radiation into heat in accordance with the process already described in connection with the example of FIG. 1. This heat is then transmitted by conduction through the walls of the cylindrical tubes and of the cones and through the metallic support plate 3 to the emitting structure 31. To this end, the two structures 30 and 31 and the plate 3 are preferably formed of material having good thermal conductivity such as, for example, aluminum, copper, brass or their alloys. The heat thus transmitted through the plate 3 to the emitting structure 31 is again converted into electromagnetic radiation which is re-emitted by the absorbent surface 31.

The structure of FIG. 3 can be employed in two different ways. It can first serve as an intermediate link for transmitting the received radiation 10 and converting this latter into radiation 32 which is re-emitted towards another emitter-receiver panel of the type $P_1$ or of the type $P_2$. This process can take place either through a vacuum or even through a few meters of air without any appreciable absorption. The structure can also be employed alone. In this case, a heat-transporting fluid having the intended function of removing the heat transmitted thereto flows in contact with the bottom face of the metallic support plate 3. This heat transmission takes place as follows:

(a) by conduction through the different metallic structures with which the heat-transporting fluid is in contact;
(b) by convection since these structures prevent the flow of heat-transporting fluid;
(c) by radiation if, in addition, the nature of the heat-transporting fluid is such that this latter has a relatively high coefficient of absorption of radiation.

The thickness e of the metallic plate 3 can vary to an appreciable extent, for example between 2 mm and a few centimeters and even more when this proves necessary for safety reasons. To this end, a $P_2$-type panel can be employed, for example, in order to form a window or cover for an apparatus in which a vacuum is created or which is subjected to a high pressure.

Figure 4:
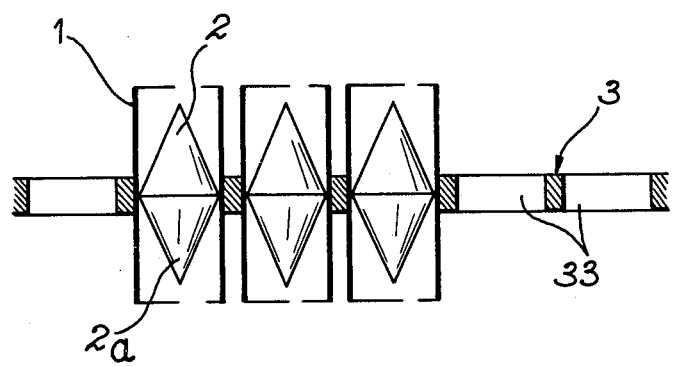
FIG. 4 shows an alternative form of construction of an emitter-receiver panel of the P₂ type.

FIG. 4 relates to an alternative embodiment of the $P_2$-type emitter-receiver panel in accordance with the invention in which the cylinders 1 are no longer contiguous but in spaced relation. In this form of construction, the metallic support plate 3 is non-continuous and is provided with a certain number of orifices, said orifices being formed right through the plate from one side to the other and disposed on a uniform lattice. There is forcibly fitted within each orifice 33 an assembly composed of a cylinder 1 provided in the central portion thereof with two cones 2 and 2a having contiguous bases, and apices located in opposite directions on each side of the plate 3.

Figure 5:
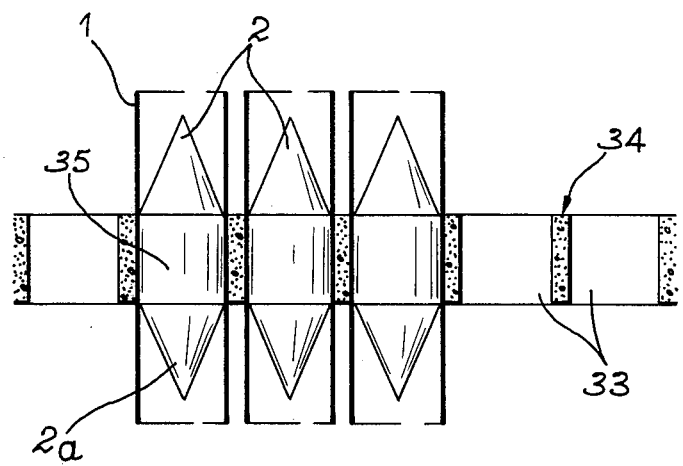
FIG. 5 shows another alternative form of an emitter-receiver panel of the P₂ type.

FIG. 5 illustrates an alternative embodiment of the panel shown in FIG. 4 and employed especially when it is desired to pass radiant heat through a wall (in the case of removal of heat produced by a boiler, for example). In this form of construction, the wall 34 is also pierced by non-contiguous orifices 33. Each orifice 33 is packed with a metallic element 35 having the shape of a right cylinder. The two ends of said cylinder are provided with extensions in the form of two cones 2 and 2a, the apices of which are in opposite directions. Each assembly constituted by a solid metallic element of the type just mentioned is inserted in a cylindrical tube 1 which passes through the wall from one side to the other. The array of orifices 33 in the wall 34 preferably constitutes a uniform lattice and the length of the cylindrical portion 35 of the solid metallic element is equal to the thickness of the wall. As is most generally the case, if the wall is made of insulating material such as concrete, for example, the complete assembly of cylindrical elements 35 constitutes the equivalent of the non-continuous metallic support plate 3 of the $P_2$-type panel thus formed. It should be pointed out that, if the wall 34 has an appreciable thickness of the order of 20 cm, for example, the radius of the cylinders 35 can be of sufficient length to ensure that the number of metallic elements passed through said wall and provided per square meter is relatively small. This is an advantage if it is borne in mind that the construction of a device of this type by means of an automatic process (such as die-stamping) cannot be contemplated as is the case with the other types of $P_1$ or $P_2$ emitter-receiver panels.

Figure 6:
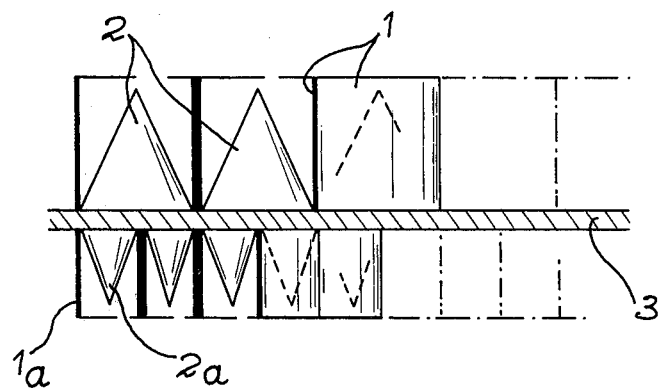
FIG. 6 shows another alternative form of an emitter-receiver panel of the P₂-type.

Finally, FIG. 6 illustrates a particular design of a $P_2$-type emitter-receiver panel in accordance with the invention in which the meshes of the lattice constituting the cylinders 1 are different on each side of the plate 3. As is apparent from the figure which is given solely by way of example, the bottom absorbent surface of the plate 3 is equipped with cylinders 1a and cones 2a having linear dimensions which are one-half the value of the dimensions of the cylinders 1 and cones 2 of the absorbent surface of the top portion of the panel.

Figure 7:
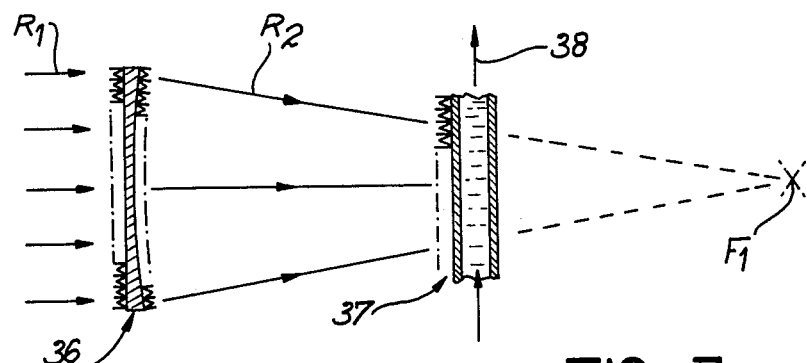
FIG. 7 shows one mode of application of the emitter-receiver panels in accordance with the present invention in which a plano-concave P₂-type panel is employed.

FIG. 7 shows a possible installation for remote heat transfer by means of a plano-concave $P_2$-type panel 36 associated at a predetermined distance with a $P_1$-type panel 37 which is swept by a heat-transporting fluid on its rear face in the direction of the arrow 38. The panel 36 receives the radiation $R_1$ on its flat entrance face and re-transmits said radiation in the form of a beam $R_2$ which converges to a virtual focus $F_1$. The $P_1$-type panel 37 collects energy from the beam $R_2$ and yields said energy to the heat-transporting fluid 38.

If the panel 36 has a diameter of 40 cm and a radius of curvature of 5 m on its concave emitting face, the thickness of metal removed at the center of the panel 36 is 4 mm. In this case the absorbent elements are no longer completely contiguous and their relative distance is calculated so as to ensure that they are practically in contact with each other at their outer ends as a function of the height of the cylinders. The panel 36 has a thickness of 10 mm, for example, in order to ensure that it has sufficiently good conduction to equalize the temperature of both faces. By employing a plano-concave panel of this type, it is possible to concentrate the heat on a diameter of the order of 20 centimeters at a distance of the order of 3 meters by reason of the transparency of pure air to infrared radiation.

Figure 8:
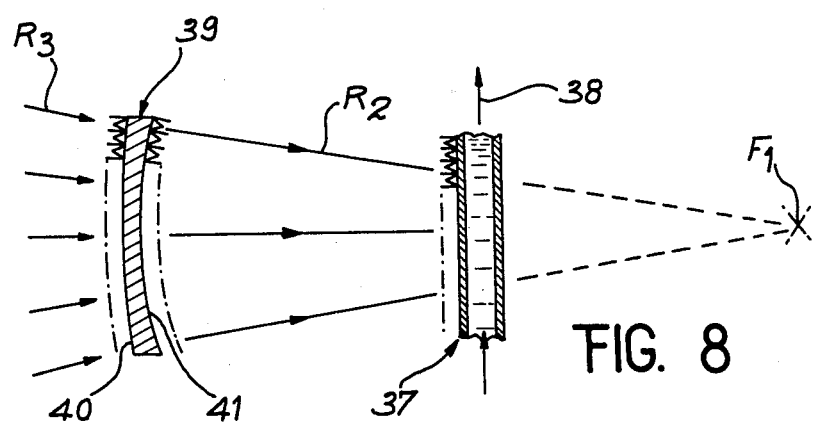
FIG. 8 shows one mode of application of the emitter-receiver panel in accordance with the present invention in which a P₂-type panel is employed, said panel being convex on the entrance side and concave on the exit side.

The device of FIG. 8 is an alternative form of the device of FIG. 7 in which the $P_2$-type panel 39 is convex on its entrance face 40 and concave on its exit face 41. In consequence, the system is capable of receiving heat radiation $R_3$ which is more highly dispersed than the radiation $R_1$ of FIG. 7 whilst the remainder of the installation operates in an identical manner.

The panels should preferably have good conductivity. As far as possible, the panels employed should be homogeneous or, in other words, made of the same material, and preferably material having good thermal conductivity, i.e. aluminum for low temperatures, copper for medium temperatures, and steel having good thermal conductivity and a melting point of 1515° C., for example, for higher temperatures.

Should it prove impossible to do otherwise—and this is the case with vacuum equipment in principle—then stainless steel is employed, for example 304 stainless steel which has a melting point of 1427° C. and relatively low heat conduction while nevertheless offering an advantage in that it transmits only a small amount of heat by conduction to the remainder of the equipment. The thicknesses of the panel bases or plates in which the cylindrical-conical elements are housed are very variable. In some panels, such thicknesses are of the order of 2 mm but can attain values of 30 to 40 mm in the case of thermal windows designed to provide vacuum protection of an apparatus or in the case of the elements of a boiler under pressure.

Figure 9:
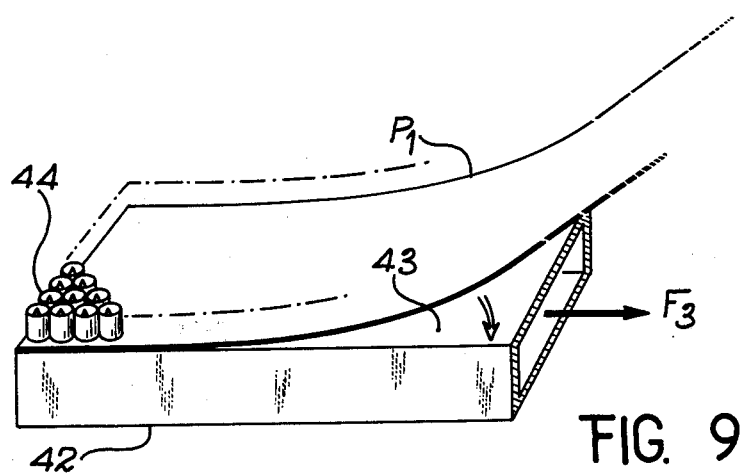
FIG. 9 shows an emitter-receiver panel device mounted in a parallelepipedal heat-absorption structure in which a heat-transporting fluid is circulated.

FIG. 9 shows an absorption device for removing radiant energy by means of a duct 42 of parallelepipedal shape through which a heat-transporting fluid flows in the direction of the arrow $F_3$. In a duct 42 of this type, the duct face 43 which receives the radiation to be collected is covered externally by a $P_1$-type receiving panel in accordance with the invention. The duct 42 is constituted for example by a rectangular tube of aluminum, of brass, of stainless steel or even of plain carbon steel. The $P_1$-type panel which is located on top of the rectangular tube on the face 43 and only a few cylindrical elements of which are shown at 44 is powerfully applied against said top face 43. The very thin $P_1$-type panel is obtained very simply by die-stamping and receives the radiation which the device is intended to collect. The installation of FIG. 9 finds a particularly advantageous application in the collection of solar radiation. By way of example, the heat-transporting fluid $F_3$ employed for this application can be a gas under pressure since a duct 42 fabricated from an aluminum alloy is capable of withstanding a pressure of the order of 33 kg/cm² or even 50 kg if stainless steel ducts are employed. A pressure of this order of magnitude permits very satisfactory heat removal. It should also be noted that the rate of heat transfer between the heat-transporting fluid and the duct 42 can be increased even further by increasing the convection within said duct. To this end, it is possible for example to line the internal face of the duct 42 with $P_1$-type metallic strips provided with elements of very small size. The increase in convection thus obtained makes it easier to produce a temperature rise in those portions of the duct 42 which are not exposed to the sun's rays and thus to increase heat exchanges.

Figure 10A:
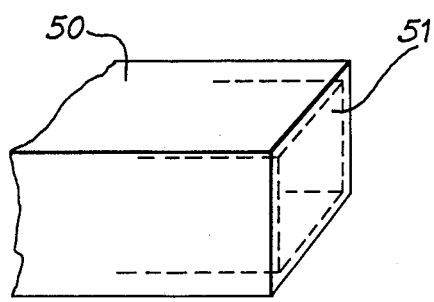
FIGS. 10a, 10b and 11 show the use of P₁-type and P₂-type panels for the recovery of heat generated by a physical apparatus employed for condensing a positively-charged heavy ion beam.
Figure 10B:
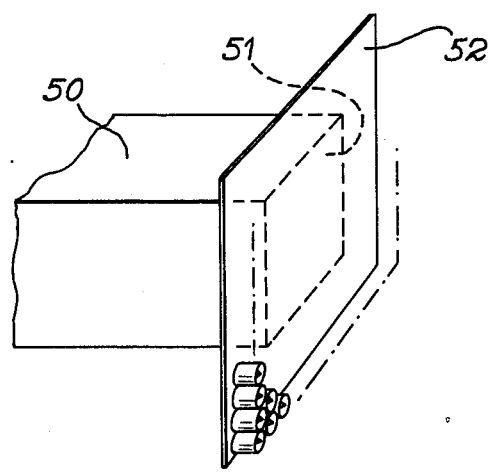
Figure 11:
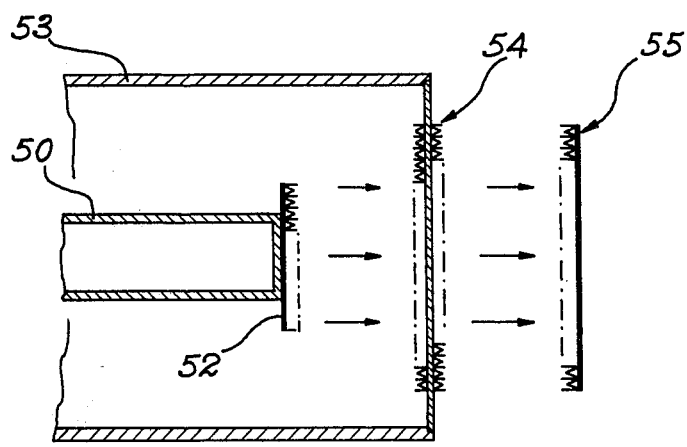

FIGS. 10a, 10b and 11 make it possible to understand the operation of an installation which comprises three associated panels of the $P_1$ and $P_2$ types and serves to cool an apparatus placed in a vacuum and to recover the heat thus collected.

FIG. 10a is a partial view of an apparatus employed for condensing a beam of positively-charged heavy ions. This apparatus is represented schematically by a parallelepiped 50 having an end-wall 51 on which the particles are condensed and on which the principal evolution of heat takes place. The apparatus thus described is constituted externally by a thin-walled stainless steel tube of rectangular section having a thickness of 2 to 3 mm, for example. By way of example, the length of the tube 50 is 60 cm and the dimensions of the tube end-wall 51 are 40 cm by 50 cm. If the particles received within the interior of the tube 50 on the face 51 have an energy of 20 keV and correspond to a current intensity of the order of 1 ampere, the total power due to condensation of the charged particles, namely 20 KW, is localized on the end-wall 51 of the apparatus. When no provision is made for any cooling panel and assuming that the stainless steel has an emissivity ratio of the order of 0.1, the temperature thus attained by the end-wall of the apparatus 51 is of the order of 1630° K. in respect of a total emitting area in the vicinity of 0.50 m².

The greater part of the heat thus developed can be removed by placing on the surface 51 a $P_1$-type panel 52 in accordance with the invention and having a width of 80 cm and a height of 70 cm. In other words, the panel projects to a distance of 15 cm on each side of the end-wall 51 of the apparatus. Additional masses of copper in contact with the tube 50 and the $P_1$-type panel 52 can further increase the heat flux transmitted by the tube 50 to said panel 52.

In any case, when equilibrium is attained, it can be assumed that the power of 20 KW is radiated by the panel 52, the coefficient of emission of which is very close to unity as has been proved by practical experimentation. Under these conditions, the panel radiates 20 KW over an area of 0.56 m², namely 35.7 KW/m², which corresponds in the case of a black body to a temperature of 891° K. which is compatible with condensation of heavy ions.

The entire device is placed within a cylindrical stainless steel chamber 53 having a diameter of 1.20 m in which is maintained a vacuum of the order of $5 \times 10^{-6}$ torr. The energy radiated by the $P_1$-type panel 52 is received by a $P_2$-type panel 54 which is inserted in the end-wall of the chamber 53 or which can constitute the end-wall of said chamber. The support plate of the panel 54 is a stainless steel cylinder having a thickness of 30 to 40 mm and a diameter of 0.90 m. The surface area of this double panel is 0.64 m².

By reason of the energy distribution of the power emitted by the $P_1$-type panel 52, it can be assumed that 19 KW reach the $P_2$-type panel 54 which is located at a distance of 40 to 60 cm from the panel 52. Assuming a loss of 12% in the case of the energy radiated by the inner face of the panel 54, the outer face of said panel therefore radiates 19 KW×0.88, namely approximately 26.1 KW/m² when the temperature is at equilibrium; its temperature is therefore of the order of 824° K. The remaining energy (16 KW) is then transmitted to a $P_1$-type or $P_2$-type panel 55 in order to be extracted by a heat-transporting fluid (not shown). Said panel 55 is square and measures 1 m×1 m; it can be located at a distance of 30 to 100 cm from the exterior of the panel 54 (as shown in FIG. 11). Under these conditions, it may be further assumed that 95% of the energy arrives on the entrance surface of the panel 55, namely approximately 15.2 KW. As a result of corrections (depending on the distance), approximately 86 to 92% are available on the exit face of the panel 55 when equilibrium is established. If a mean value of 88% is assumed as before, approximately 13 KW can accordingly be transmitted to the heat-transporting fluid. Under these conditions, this power corresponds to a temperature of the exit face of the panel 55 of 704° K., namely 431° C., and will therefore be transmitted in principle to a gas under pressure. In fact, the heat-transporting fluid cannot be water since the temperature is too high but consists of a gas such as helium or argon. The device with the last panel 55 constitutes the heat source of a closed-cycle gas turbine, thus making it possible to convert the heat energy into electrical energy with high efficiency and to recover a relatively large fraction of the electric power consumed in order to accelerate the ion beam.

Figure 12:
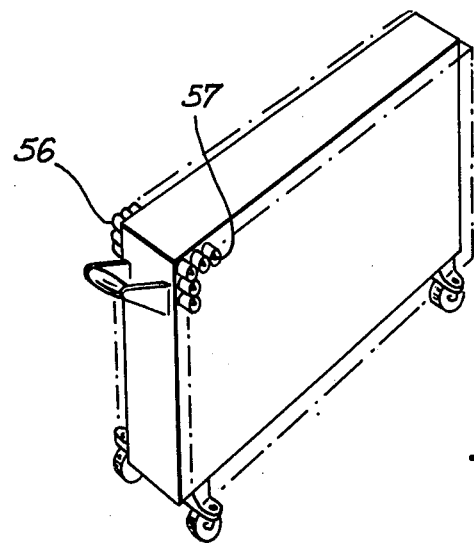
FIG. 12 shows the use of P₁-type panels for recovering the heat irradiated by a hearth or fireplace.

Referring now to FIGS. 12 and 13, there will be described one possible application of the emitter-receiver panel in accordance with the invention to recovery of the quantity of heat delivered by the hearth of a domestic chimney or fireplace.

In a fireplace, the flame temperature measured with an optical pyrometer fluctuates between 1000° C. and 1100° C., the mean dimensions of the flame surface being of the order of 50 cm in height and 15 cm in width. In order to absorb the thermal energy radiated by the fire in a domestic fireplace, a radiator of the type shown in FIG. 12 has been constructed. This radiator has the shape of a rectangular parallelepiped, is 80 cm in height, 100 cm in width and 15 cm in thickness. Two $P_1$-type emitter-receiver panels 56 and 57 are provided on the two opposite faces of said radiator. The internal space formed between the panels 56 and 57 is filled with plain water. The unit is capable of displacement and is mounted on rollers 64 for this purpose. The mass of water is sufficient to ensure that the heat-generating capacity of the unit permits heating of the entire room over a long period of time.

In fact, if 1 KW is absorbed and the mass of water is of the order of 100 liters, approximately 7 hours are required in order to raise the temperature by 60° C.

In another embodiment shown in FIG. 13 which is an overhead sectional view of a fireplace 58, several $P_1$-type panels 59, 60 and 61 serve to constitute a kind of screen behind the hearth in order to absorb and reflect the heat energy produced. The main radiator 62 which is equipped with two $P_1$-type emitter-receiver panels as in the case of FIG. 12 is located in front of the hearth and receives the heat energy on the one hand directly from the flames of the hearth and on the other hand by re-emission from the panels 59, 60 and 61. If the radiation received is excessive, it is possible to make use of a secondary radiator 63 which is connected to the main radiator 62.

What is claimed is:

1. An emitter-receiver panel having high radiant energy efficiency, constituted by a heat-conducting metallic support plate on at least one face of which is provided an absorbent surface composed of metallic tubes in the form of right circular cylinders having axes at right angles to the surface and disposed on a uniform lattice, and by right circular metallic cones each placed within the interior of one of said tubes in the form of right circular cylinders, the base of each cone being located at the intersection of said cylindrical tube with said plate and the apex of each cone being located at a point within the interior of said cylindrical tube, the external surface of each cone being adapted to cooperate with the internal surface of the cylindrical tube within which said cone is located in order to trap the entire radiation received by said panel, the half angle $\theta$ of the apex of each cone satisfying the expression $h-h' > d/2$ tangent $\theta$, wherein h is the height of each of the right cylindrical metallic tubes, h' is the height of each of the metallic cones and d is the diameter of each tube, whereby each incident ray impinging upon the surface of one of the cones is reflected from the internal surface of the tube in which the cone is placed.

2. An emitter-receiver panel according to claim 1, wherein the cylindrical metallic tubes are contiguous over the entire surface of the metallic support plate.

3. An emitter-receiver panel according to claim 1, wherein the metallic support plate is flat and of constant thickness.

4. An emitter-receiver panel according to claim 1, wherein the metallic support plate has a variable thickness in order that at least one of the absorbent faces of said plate may have a slightly convex or concave profile.

5. An emitter-receiver panel according to claim 1, wherein the two faces of the panel are each equipped with an absorbent surface in which the metallic tubes in the form of right cylinders are disposed on a uniform lattice with a different pitch.

6. An emitter-receiver panel according to claim 1, wherein the metallic support plate is non-continuous, in which case the absorbent double-surface panel is constituted by cylindrical tubes each fitted in the central portion thereof with two cones having common bases joined together in contiguous relation, said tubes being adapted to traverse a wall from one side to the other through openings in which they are inserted and disposed on a uniform lattice.

7. An emitter-receiver panel according to claim 1, wherein the metallic support plate is non-continuous, in which case the absorbent double-surface panels are constituted by cylindrical tubes each fitted in the central portion thereof with a solid metallic element having the shape of a right cylinder and provided at the two extremities thereof with extensions in the form of two cones having oppositely directed apices, said cylindrical tubes being adapted to traverse a wall from one side to the other through openings in which they are inserted and disposed on a uniform lattice.

8. An emitter-receiver panel according to claim 1, wherein the flat metallic plate, the right cylindrical metallic tubes and the right metallic cones are fabricated from heat-conducting material.

9. An emitter-receiver panel according to claim 8, wherein the heat-conducting material from which the flat metallic plate, the right cylindrical metallic tubes and the metallic cones are fabricated is chosen from the group comprising copper, aluminum, brass and their alloys and stainless steel.

10. A method of utilization of an emitter-receiver panel according to claim 1, wherein said panel directly transmits through one panel face which is in contact with a heat-transporting fluid the radiant energy received by the other panel face.

11. A method of utilization of an emitter-receiver panel according to claim 1, wherein said panel serves as an intermediate element for heat transmission by re-emitting through one panel face towards another panel the radiant energy received by the other panel face.

12. The emitter-receiver panel of claim 1 wherein the metallic tubes are contiguously disposed on a uniform lattice.

* * * * *